Figure 1:
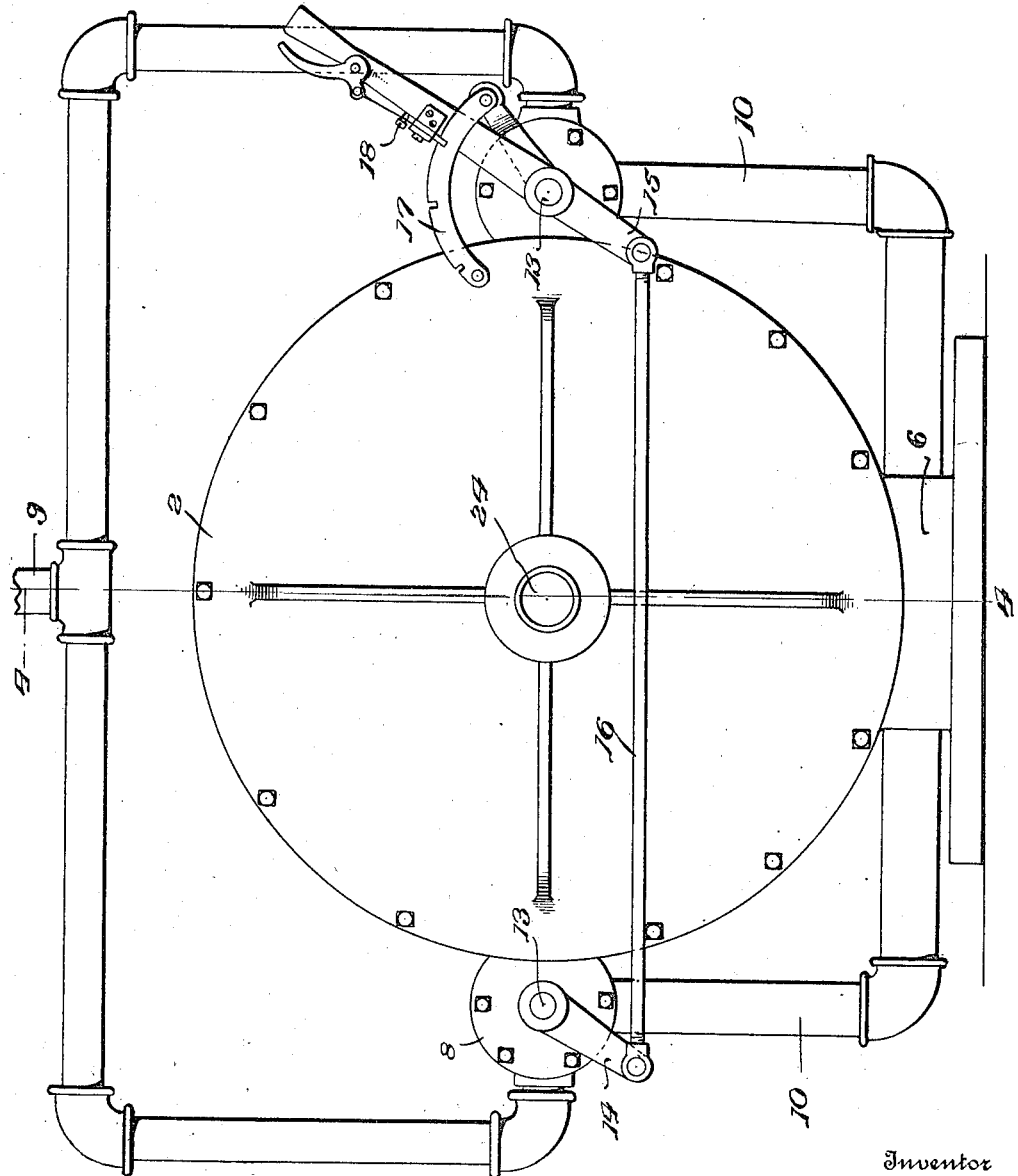

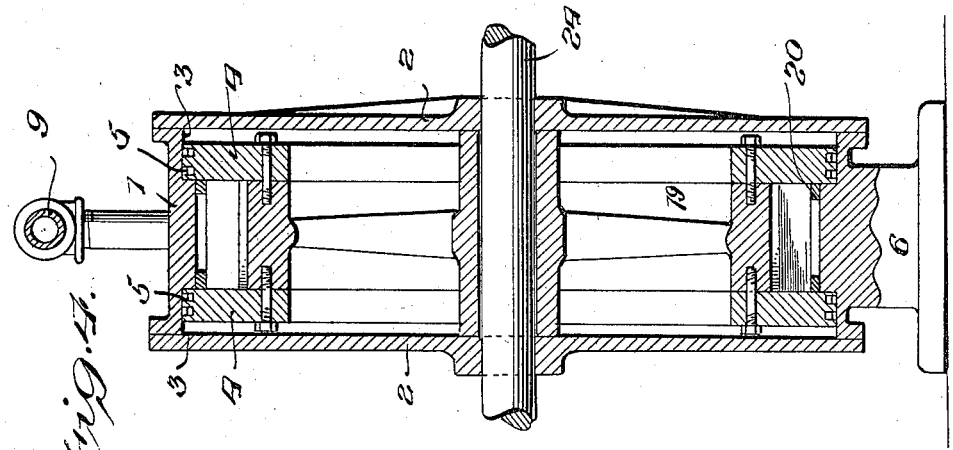
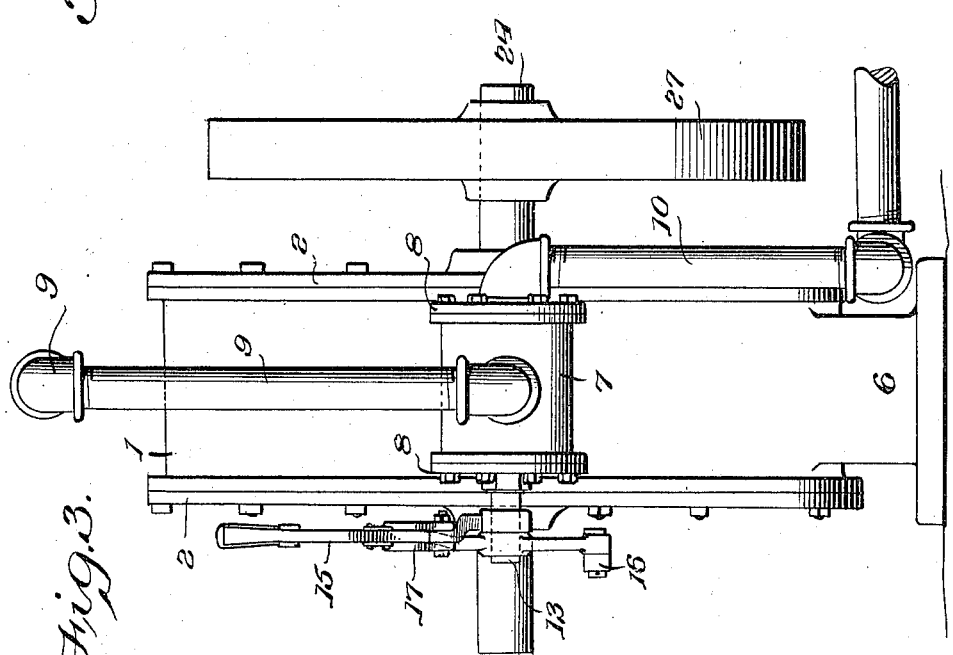

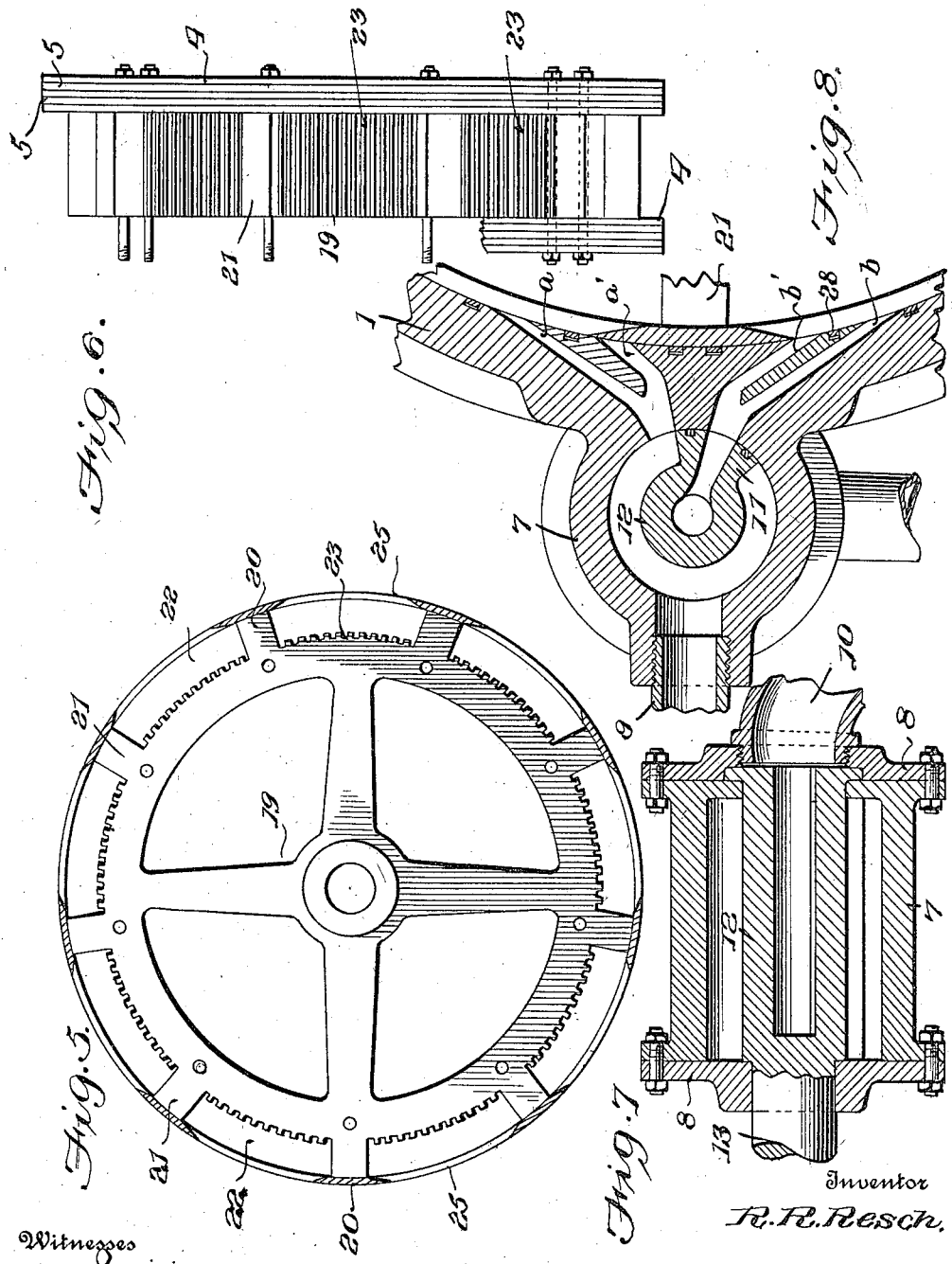

UNITED STATES PATENT OFFICE.

RALPH R. RESCH, OF TRINIDAD, COLORADO.

ROTARY ENGINE.

1,181,479.          Specification of Letters Patent.        Patented May 2, 1916.

Application filed February 17, 1915. Serial No. 8,902.

*To all whom it may concern:*

Be it known that I, RALPH R. RESCH, a citizen of the United States, residing at Trinidad, in the county of Los Animas and State of Colorado, have invented certain new and useful Improvements in Rotary Engines, of which the following is a specification.

The invention has relation to motors and more particularly to engines of the rotary type, the purpose being to provide an engine of this character which is reversible and adapted to be started in either direction from any point since there is no dead center.

A further purpose of the invention is the provision of a rotor of peculiar form, the same embodying pockets, the bottoms of which are toothed, or ribbed, to provide positive engagement for the motive medium in the impact thereof upon the rotor, the latter being further provided with pockets having overhanging peripheral portions which are beveled to cutting edges so as to minimize the resistance to the passage of the motive medium.

The invention also aims to provide a rotor of novel structural formation, the same embodying a body portion formed with rings, and a band fitted to the outer edge of the body portion and having openings in register with the spaces formed between the wings, the parts between the openings being in line with the wings and projecting a like distance upon opposite sides thereof.

The invention also has for its object to provide an oscillatory valve which is of such formation as to be practically balanced, such valve controlling the inlet and the exhaust and formed with an exhaust passage for the escape of the spent motive medium.

A further purpose of the invention is the provision of a rotary engine which may be reversed and started in either direction by opening the throttle controlling the supply of motive medium to the engine, such engine embodying a plurality of ports which are used both for the inlet and the exhaust according to the direction of travel of the rotor, the ports being so disposed as to prevent the waste of motive medium or the stopping of the engine on a dead center.

The invention also provides novel means for simultaneously reversing the valves, the connections being such in conjunction with the ports as to insure the starting of the engine in an opposite direction when the motive medium is turned on.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Figure 2:
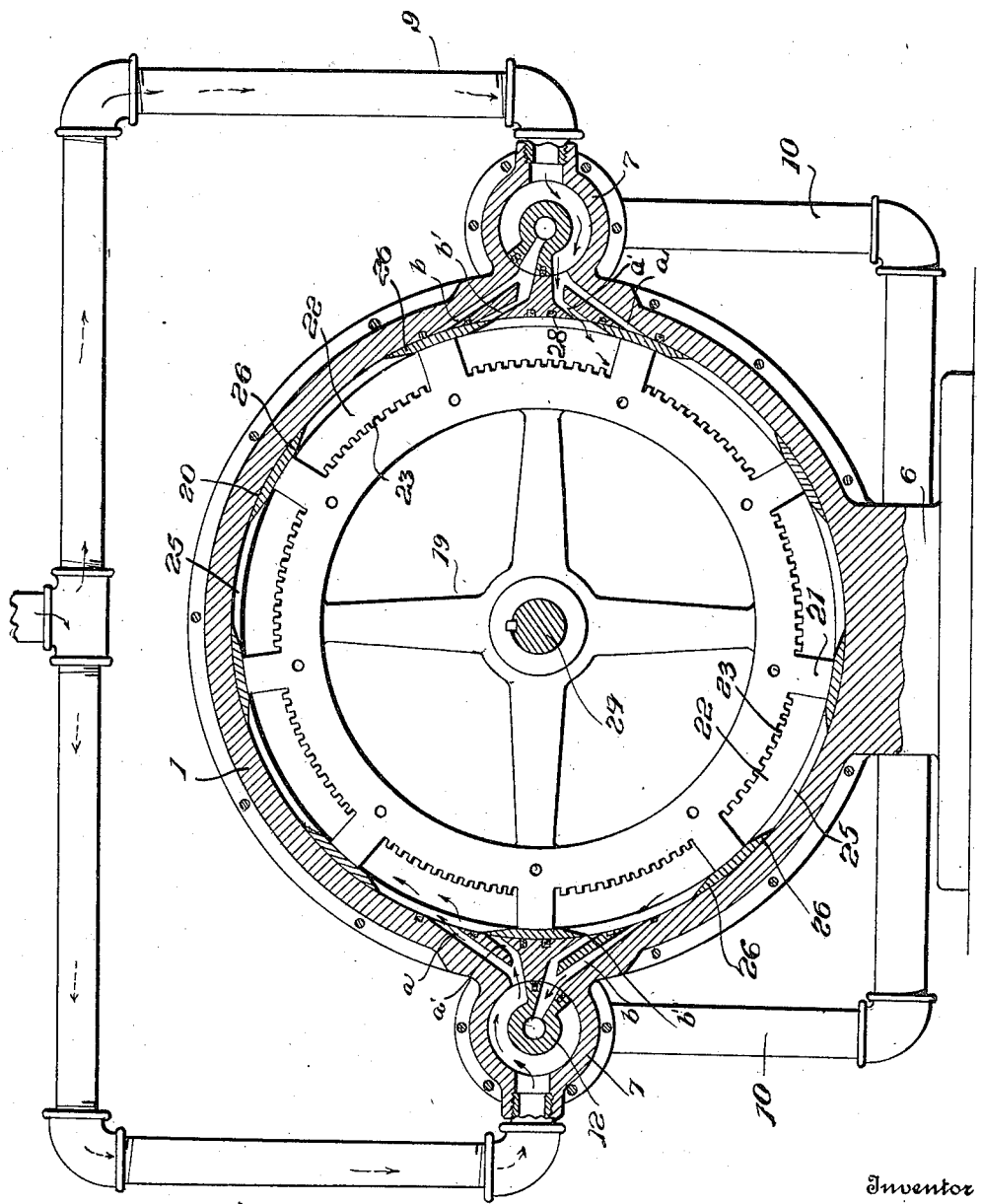

Referring to the drawings, Figure 1 is a side view of a rotary engine embodying the invention, the valve operating mechanism being on the near side. Fig. 2 is a vertical central longitudinal section, the body of the rotor being in full lines. Fig. 3 is a front view of the engine. Fig. 4 is a section on the line 4—4 of Fig. 1. Fig. 5 is a side view of the body of the rotor with the band in position and in section. Fig. 6 is an edge view of the rotor and the packing plates at the sides thereof, a portion of one of the packing plates being broken away. Fig. 7 is an enlarged sectional view of one of the valve chambers, the valve operating therein and a portion of the casing. Fig. 8 is an enlarged section of one of the valve chambers and a portion of the cylinder adjacent thereto.

Corresponding and like parts are referred to in the following description and indicated in all the views of the drawings by the same reference characters.

The engine, as is usual, comprises a stator or casing and a rotor or power driven wheel.

The casing comprises a cylinder 1 and heads 2, the latter being bolted or otherwise secured to the cylinder which is preferably outwardly flanged for such purposes. The cylinder is enlarged at opposite ends, as indicated at 3, to receive the outer edge portions of the packing plates 4 secured to the sides of the rotor. The outer edges of the packing plates 4 are formed with annular grooves to receive packing rings 5. The engine is mounted upon a base 6 which preferably forms a part of the cylinder and which is adapted to be secured upon a suitable bed. The cylinder is formed at diametrically opposite points with valve chambers 7, which are closed at their ends by heads 8. The valve chambers 7 receive the motive medium and exhaust, the motive medium being supplied by means of a pipe 9 from a suitable source and the exhaust being carried off to a convenient point of discharge by means of a pipe 10, the latter connecting with one of the ends of the chamber and the supply pipe 9 connecting with a side of the chamber. A plurality of ports establish communication between each of the valve chambers and the cylinder of the casing. The ports are indicated at $a$ and $a'$ and incline in one direction. Other ports $b$ and $b'$ incline in an opposite direction. The ports $a$ and $a'$ merge into a single opening which is in communication with the valve chamber. The ports $b$ and $b'$ likewise merge into a single opening which is in communication with the valve chamber. The ports $a$—$a'$ and $b$—$b'$ receive the motive medium and exhaust according to the direction of rotation of the rotor. When the rotor is traveling in a clock-wise direction the ports $b$—$b'$ admit the motive medium whereas the ports $a$—$a'$ receive the exhaust. A plurality of ports are necessary to prevent the stopping of the engine on a dead center and to insure its starting upon opening the throttle to admit motive medium to the engine. The two sets of ports incline in opposite directions at a like angle. The ends of the ports opening into the casing are so disposed as to prevent a live port and an exhaust port communicating at the same instant with any one of the pockets formed between adjacent wings of the rotor. The plural ports insure the opening of one into the casing at any position that the rotor may stop so that upon turning on the motive medium the engine will immediately start in one direction or the other according to the position of the valves.

The valve is of peculiar shape and is hollow so as to receive the exhaust. The valve is mounted within the chamber 7 so as to receive an oscillating movement and when adjusted remains in such position until it is required to reverse the engine when the valve is moved in an opposite direction to admit the motive medium into the ports previously receiving the exhaust and to admit of the ports previously receiving the motive medium carrying off the exhaust. The valve comprises a sector-shaped portion 11 and a rounded portion 12. The longitudinal edge portions of the part 11 receive packing whereby a tight joint is maintained between the valve and the wall of its chamber. The opening formed in the rounded portion 12 communicates at one end with the exhaust pipe 10. The opposite end of the valve is formed with a stem 13 which projects beyond the head of the valve chamber. An arm 14 is secured to the stem 13 of one of the valves whereas a lever 15 is secured to the stem of the other valve. A rod 16 connects the arm 14 with the lever 15. Movement of the lever 15 is transmitted by means of the rod 16 and arm 14 to the valve remote from the one to which the lever 15 is attached, hence both valves are simultaneously actuated when the lever 15 is moved. A notched bar or segment 17 coöperates with a latch bolt 18 carried by the lever 15 so as to secure such lever and valves in the adjusted position. The sector-shaped portions of the valves face inward and when the valve at the right of the engine is moved to cover the ports $b$—$b'$ the valve at the left is moved in an opposite direction so as to cover the ports $b$—$b'$, the right hand valve being moved upward and the left hand valve downward. To reverse the engine the valves are moved in an opposite direction, that is, the valve at the right is moved downward to cover the ports $a$—$a'$ and the valve at the left is moved upward to cover the ports $a$—$a'$. When the motive medium is entering the ports $a$—$a'$ at the right it operates to turn the rotor in a clock-wise direction and at the same time the motive medium is supplied to the rotor at the left through the ports $a$—$a'$ in a manner to likewise operate to drive the rotor in a clock-wise direction. The ports have a tangential arrangement with reference to the rotor, hence deliver the motive medium in a direction to utilize a maximum percentage of force for operating the engine.

The rotor as hereinbefore stated comprises a body portion 19 and a band 20. The body portion 19 is substantially of wheel shape and is provided at regular intervals about its outer wall with a plurality of wings 21 which constitute blades to receive the impact of the motive medium. The spaces formed between the wings 21 constitute pockets 22. The bottoms of the pockets are toothed, ribbed or corrugated, as indicated at 23, the purpose being to provide impacting surfaces for the motive medium to spend its force when striking the rotor. The rotor is secured to the shaft 24 of the engine in any manner so as to rotate therewith. The band 20 is of a width so as to come flush at its edges with opposite sides of the part 19 and is formed at regular intervals with openings 25. The openings 25 are of less length than the distance between the outer ends of the wings 21 and are centrally disposed, thereby leaving portions 26 of the band overhanging the pockets upon opposite sides of the wings. The overhanging portions 26 project a like distance from opposite sides of the wings 21 and are beveled upon their inner faces so as to form sharp edges which offer a minimum resistance to the motive medium. The band 20 may be shrunk upon the body or wheel portion 19 of the rotor or may be secured thereto in any manner. The packing plates 4 secured to the sides of the rotor are of annular form and project beyond the band 20 so as to extend into the enlarged portions 3 of the cylinder 1. The packing plates are secured to the rotor in any substantial way and prevent any longintudinal movement of the rotor in the casing since the inner faces of the projecting portions of the plates engage the shoulders formed at the inner ends of the enlarged portions 3. The shaft 24 is mounted in the ends 2 of the casing and is provided with a fly wheel 27 which is secured thereto.

When the valves occupy one or the other of their extreme positions the motive medium enters the casing from the valve chambers through one set of ports and the exhaust from the engine leaves by way of the other set of ports and enters the valves and passes off to the predetermined point of discharge by means of the pipe 10. The engine is reversed by operating the lever 15 which simultaneously moves both valves in opposite directions with reference to the sets of ports. It is observed that the ports are so disposed with reference to the pockets of the rotor that the engine may be started from any point in either direction since the rotor does not stop upon a dead center. It is also noted that the number of pockets provided about the rotor is uneven and this facilitates the disposition of the ports so as to prevent the stopping of the engine on a dead center. It is also noted that the engine comprises a comparatively few number of parts and does not leak or require frequent packing. In order that a close joint may be had between the rotor and the inner wall of the cylinder, packing 28 is fitted in seats formed in the inner wall of the cylinder upon opposite sides of the several ports. This packing may be of any material best adapted for the purpose.

Having thus described the invention, what is claimed as new is:—

A rotor comprisng a body having outwardly extending wings and a band encircling the body portion and having openings formed therein opposite the spaces between the wings, such openings being of a less length than the distance between the outer ends of the wings, thereby forming portions which project an equal distance upon opposite sides of the wings, and such overhanging portions being beveled upon their inner faces to form sharp edges.

In testimony whereof I affix my signature in presence of two witnesses.

RALPH R. RESCH. [L. S.]

Witnesses:
  A. M. SANKEY,
  M. O. DICK.